Mar. 6, 1923.
A. M. MALLUK ET AL
1,447,260
LOCKABLE COVER FOR AUTOMOBILE FUEL TANKS
Filed Aug. 3, 1922
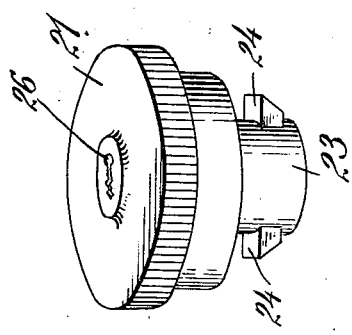
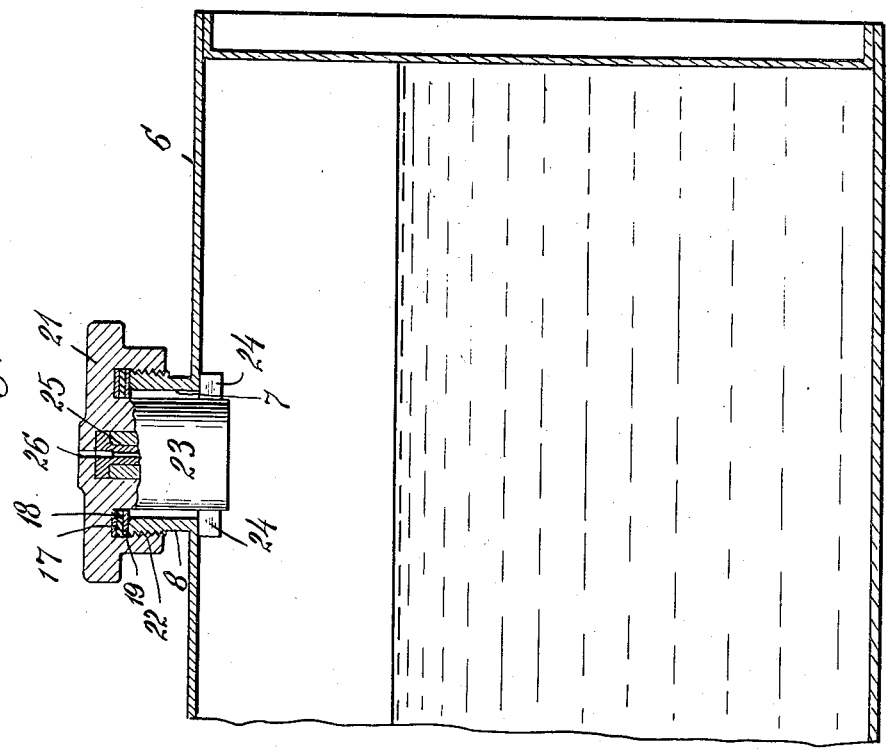
INVENTORS
Assad M. Malluk
Jean U. Kazee
BY
Pennie, Davis, Marvin & Edmonds
ATTORNEYS Patented Mar. 6, 1923.

1,447,260

UNITED STATES PATENT OFFICE.

ASSAD M. MALLUK AND JEAN U. KOREE, OF NEW YORK, N. Y.

LOCKABLE COVER FOR AUTOMOBILE FUEL TANKS.

Application filed August 3, 1922. Serial No. 579,340.

*To all whom it may concern:*

Be it known that we, ASSAD M. MALLUK, a citizen of the Republic of France, residing at and whose post-office address is No. 170 West 72nd Street, in the city, county, and State of New York, and JEAN U. KOREE, a subject of the King of Roumania, residing at and whose post-office address is No. 1834 Broadway, in the city, county, and State of New York, have invented certain new and useful Improvements in Lockable Covers for Automobile Fuel Tanks; and we do hereby declare the following to be a full, clear, and exact description of the invention, such as will enable others skilled in the art to which it appertains to make and use the same.

This invention relates to closures for fuel tanks, and more particularly, to lockable closures, for the fuel tanks of automobiles. The object of our invention is to provide means for preventing the unauthorized removal of the filling cap of an automobile fuel tank, whereby the liability of theft of gasoline from such tanks will be greatly reduced.

It not infrequently happens, especially when automobiles are stored in public garages, that gasoline is stolen from their tanks. The quantity of fuel stolen from any one car is usually not great enough to be of much importance to the individual owner of the car, and the owner may be reluctant, therefore, to make complaint of thievery to the authorities in charge of the garage. However, this is a source of continuous annoyance and, in addition, the quantity of fuel stolen in a year from the various cars in a large garage aggregates a relatively large number of gallons, which represents a considerable sum of money taken from car owners as a class.

The methods by which the gasoline is removed from the fuel tanks vary, but in the majority of cases it is removed through the filling opening in the main tank. One of the many ingenious methods by which gasoline is very quickly and easily taken out of the tanks is by siphoning with a rubber tube. In order to steal gasoline in this way, it is only necessary to take off the cap from the filling opening, insert a rubber tube or hose, a few feet in length, and then start the flow of the gasoline into a can or other convenient receptacle by sucking it into the hose by the lips, until the hose is filled. After the flow has once started it will, of course, continue at a rate depending upon the size of the hose, its length and the difference in elevation between the outside end of the hose and the liquid within the tank.

In order to prevent the unauthorized removal of gasoline from automobile fuel tanks, we have provided by our present invention a novel closure for such tanks, the cap of which is easily and readily locked in closed position, and which may not be removed except by the person who possesses a key to the lock.

The preferred form of our invention provides for a cap with the locking mechanism entirely self-contained therein. The inner surface of this cap is extended toward the interior of the tank in the shape of a cylindrical boss, and within this boss is situated a locking element controlling one or more transversely movable bolts adapted to engage the tank to prevent the unscrewing of the cap.

This invention may be better understood by referring to the accompanying drawings in which, Fig. 1 is a fragmentary section view of a fuel tank provided with one form of improved lockable cover, and Fig. 2 is a perspective view of a slightly different form of lockable cover than that shown in Fig. 1.

Referring to these drawings, reference numeral 6 represents the fuel tank of an automobile having an opening 7, (Fig. 1) for the delivery of fuel thereto. The filling neck 8 is secured to the tank in any suitable manner, such as by welding or the like, and is provided with the external screw threads 22, adapted to receive the internally threaded cap 21. The neck 8 shown in the drawing may be the neck ordinarily provided on fuel tanks, such as automobile fuel tanks. The cap 21 engages the external screw threads on the neck 8 in the ordinary manner. We prefer to employ a washer or packing ring so that the cap 21 may serve as an efficient seal for the tank. As shown in Fig. 1, the packing ring 17 is provided with a central portion 18 of specially resilient or elastic material such as spongy rubber, which is faced on both sides as shown at 19 with a relatively tough wear-resisting and insoluble material, such as fibre.

Figs. 1 and 2 illustrate the preferred embodiment of our invention. In these figures the cap 21 is adapted to be secured upon the filling neck 8 by the cooperating threads 22 by which the packing washer 17 is compressed to form a fluid-tight joint to prevent the escape of fuel. The interior of the cap is extended inwardly to form a cylindrical boss which, in the case of tanks having relatively short filling necks, will preferably extend within the interior of the tank 6. Carried near the inner end of boss 23 are one or more (preferably two) transversely movable bolts 24, which are controlled by the lock element or mechanism 25, in such manner that when a key is inserted in the keyhole 26, the bolts 24 may be withdrawn, by rotation of the key to a position where their ends will be substantially flush with the cylindrical surface of boss 23. In the position shown in the drawings, which is the closed position of the cap, the bolts 24 engage the interior surface of the tank itself and prevent the removal of the cap. In order to take off the cap it is necessary to unlock it with the key, thus withdrawing bolts 24 until they disengage the tank.

It was mentioned above that it is preferable to have the boss 23 extend within the tank 6. The purpose of this is to enable the cap to be locked in place by the engagement of bolts 24 with the interior surface of the tank, as this is an extremely simple construction and does not require any change whatever in an existing tank. All that the motorist need purchase is a new lockable cap. Some cars, however, are provided with tanks having long filling necks and in such necks it may be necessary to weld or solder a suitable shoulder to coact with bolts 24.

The improved lockable cover is preferably designed so that when it is screwed onto the tank and the locking bolt extended by means of the key, the working or active part of the bolt will engage the inner surface of the tank. When this condition occurs the bolt serves to clamp the cover in place. The locking means is just as effective for the purpose of preventing the removal of the cover, however, if the bolt does not engage the inner surface of the tank, but is disposed at a considerable distance away from the inner surface of the tank. For example, if the working surface of the bolt is say one quarter of an inch away from the inner surface of the tank, it will be impossible to remove the cover completely due to the fact that the bolt will engage the inner surface of the tank before the cover is completely removed. It is thus apparent that the improved lockable cover may be employed to advantage with fuel tanks having refill necks of different lengths. In fact, by providing a few standard sizes of lockable covers they may be used on practically all types of automobiles having fuel tanks supplied with necks of varying lengths. The improved cover may be made at very low cost for it does not have to be made to exact dimensions for the reasons above stated.

The locking mechanism may be of the type in which the bolt is thrown in both directions by means of the key, or it may be of the automatic type in which the bolts are biased in the locked position by means of a spring and retracted to the unlocked position by the key. In this case the bolts will be beveled as shown in Fig. 7.

The use of this lockable cover effectively prevents the theft of gasoline from the tanks of cars at all times, and at the same time it is quite convenient to operate on account of its simplicity and the small number of parts required.

It is to be understood that the size and proportions of the various parts may be varied without departing from the principle of the invention, which is not limited to the particular embodiment shown and described, but is intended to include such modifications thereof as fall within the scope of the appended claims.

We claim:

1. In a closure for the fuel tanks of automobiles, the combination with the unobstructed filling opening thereof, of a closure cap adapted to fit over said opening, and radially projected securing means carried by said cap adapted to extend within said opening and engage the inner face of the receptacle proper, said securing means being so constructed and arranged as to prevent the removal of said cap from the filling opening.

2. In a closure for the fuel tanks of automobiles, the combination with the filling opening thereof provided with an unobstructed annular rim or neck, of a closure cap adapted to fit over said rim, and radially projected securing means carried by the cap adapted to extend below the base of said rim and engage the inner face of the receptacle proper, said securing means being so constructed and arranged as to prevent the removal of said cap from the filling opening.

3. In a closure for the fuel tanks of automobiles, the combination with the filling opening thereof provided with an unobstructed annular rim or neck, of a closure cap adapted to fit over said rim, and radially projected securing means carried by the cap adapted to extend below the base of said rim and engage the inner face of the receptacle proper, adjacent said opening, said securing means being so constructed and arranged as to prevent the removal of said cap from the filling opening.

4. In a closure for the fuel tanks of automobiles, the combination with the filling opening thereof provided with an unobstructed annular rim or neck, of a closure cap adapted to fit over said rim, radially projected securing means carried by the cap adapted to extend below the base of said rim and engage the inner face of the receptacle proper, adjacent said opening, said securing means being so constructed and arranged as to prevent the removal of said cap from the filling opening, and means for applying and releasing said securing means.

In testimony whereof we affix our signatures.

ASSAD M. MALLUK.
JEAN U. KOREE.